US008103117B2

(12) United States Patent
Takahashi

(10) Patent No.: US 8,103,117 B2
(45) Date of Patent: Jan. 24, 2012

(54) IMAGE PROCESSING APPARATUS AND IMAGE PROCESSING METHOD EMPLOYING RECURSIVE FILTERING

(75) Inventor: Naoto Takahashi, Kunitachi (JP)

(73) Assignee: Canon Kabushiki Kaisha, Tokyo (JP)

( * ) Notice: Subject to any disclaimer, the term of this patent is extended or adjusted under 35 U.S.C. 154(b) by 710 days.

(21) Appl. No.: 12/028,981

(22) Filed: Feb. 11, 2008

(65) Prior Publication Data

US 2008/0253679 A1    Oct. 16, 2008

(30) Foreign Application Priority Data

Mar. 6, 2007    (JP) ................................. 2007-056372

(51) Int. Cl.
    *G06K 9/40*    (2006.01)
(52) U.S. Cl. ....................................................... 382/265
(58) Field of Classification Search .......... 382/260–265, 382/275; 345/607–610
    See application file for complete search history.

(56) References Cited

U.S. PATENT DOCUMENTS

| | | | | | |
|---|---|---|---|---|---|
| 4,064,530 | A | * | 12/1977 | Kaiser et al. ................... | 348/621 |
| 5,467,380 | A | * | 11/1995 | De Jonge et al. ............ | 378/98.2 |
| 5,574,512 | A | * | 11/1996 | Saeger ........................... | 348/620 |
| 7,199,838 | B2 | | 4/2007 | Lin et al. ........................ | 348/607 |
| 2002/0012477 | A1 | * | 1/2002 | Inoue ............................ | 382/284 |
| 2005/0117814 | A1 | * | 6/2005 | Riemens et al. .............. | 382/275 |
| 2005/0169534 | A1 | | 8/2005 | Takahashi ..................... | 382/203 |
| 2005/0254707 | A1 | | 11/2005 | Takahashi ..................... | 382/169 |
| 2005/0280739 | A1 | * | 12/2005 | Lin et al. ....................... | 348/607 |

FOREIGN PATENT DOCUMENTS

| | | |
|---|---|---|
| JP | 11-252373 A1 | 9/1999 |
| JP | 2002-010106 | 1/2002 |
| JP | 2002-112992 A1 | 4/2002 |
| JP | 2005-003444 A1 | 1/2005 |
| KR | 10-2005-120563 | 12/2005 |

OTHER PUBLICATIONS

Katsaggelos et al. ("Adaptive image sequence noise filtering methods", SPIE, vol. 1606, 1991, pp. 716-727).*
Brailean et al. ("Noise Reduction filters for dynamic image sequences: A review", Proceedings of the IEEE, vol. 83, No. 9, Sep. 1995, pp. 1272-1292).*
Reinen ("Noise Reduction in Heart Movies by Motion Compensated Filtering", SPIE, vol. 1606, 1991, pp. 755-763).*
Zlokolica et al. (Fuzzy logic recursive motion detection and denoising of video sequences, Journal of Electronic Imaging, 15(2), Apr.-Jun. 2006, pp. 023308-1 to 023308-13).*
Japanese Office Action, dated Aug. 8, 2011, issued in counterpart Japanese Patent Application No. 2007-056372.

* cited by examiner

*Primary Examiner* — Yubin Hung
(74) *Attorney, Agent, or Firm* — Fitzpatrick, Cella, Harper & Scinto

(57) ABSTRACT

Recursive filtering that multiplies image data of a previous frame read out from a memory by a, multiplies image data of the present frame by (1−a), adds the resultants together, and stores the resultant of the addition in the memory is performed. Here, a is a coefficient in the range of 0<a<1. Then, spatial filtering is performed on the recursively filtered image data using a spatial filter changed in accordance with a coefficient of the recursive filtering and the number of times the recursive filtering has been performed.

9 Claims, 8 Drawing Sheets

IMAGE PROCESSING APPARATUS AND IMAGE PROCESSING METHOD EMPLOYING RECURSIVE FILTERING

BACKGROUND OF THE INVENTION

1. Field of the Invention

The present invention relates to a technique for reducing noise in a captured video.

2. Description of the Related Art

In the field of X-ray video imaging, a two-dimensional digital X-ray radioscopy device has been proposed, in which an inputted X-ray is converted into visible light using a scintillator (a fluorophore) and an image intensifier, and an image of the resulting visible light is captured by a TV camera using a CCD-type image sensor.

Meanwhile, a system that replaces the TV camera with a flat-panel detector has recently been proposed (for example, see Japanese Patent Laid-Open No. 2005-003444).

With the above-mentioned X-ray radioscopy device, it is common to perform various types of image processing in order to improve the quality of the captured video. Noise reduction processing for reducing quantization noise, system noise, and the like is one type of such processing. Recursive filtering is an example of a conventionally-used noise reduction processing (see Japanese Patent Laid-Open No. 2002-112992). As illustrated in FIG. 7, a general recursive filter uses a frame memory 701, which stores one frame's worth of image data; an adder 702 performs weighted adding on the image data of the present frame and the image data of the previous, recursively filtered frame. Temporally random noise is thereby reduced. Expressing this kind of recursive filtering as a mathematical formula results in the following:

$$Y_t = (1-a) \times X_t + a \times Y_{t-1} \quad (1)$$

Here, t>0, and $Y_0 = X_1$.

Here, $X_t$ is image data of the $t^{th}$ frame; $Y_t$ is image data of the recursively filtered $t^{th}$ frame; and a is a feedback coefficient. The range of the coefficient a is set to 0<a<1.

As shown by formula (1), with recursive filtering, it is possible to adjust the addition ratio of the image data of the recursively filtered previous frame and the image data of the present frame based on the feedback coefficient. A greater feedback coefficient value results in greater effects on the part of the noise reduction processing.

With the above-mentioned recursive filtering, effect of afterimage appears as motion blur in images that have movement. There is, therefore, a method that detects movement between the present frame and the previous frame based on the difference between the two, and alters the feedback coefficient in each frame in accordance with the detected movement (i.e., reduces the feedback coefficient when the movement is great), when a high value has been set for the feedback coefficient. See, for example, Japanese Patent Laid-Open No. 2005-003444 and Japanese Patent Laid-Open No. 2002-112992.

However, with the abovementioned recursive filtering, when recording is first commenced, no frame exists prior to the first frame, and thus noise suppression cannot be carried out. Furthermore, there is a problem that the noise suppression effect increases as the feedback coefficient is greater, and thus the noise suppression effect varies from frame to frame. For example, if the feedback coefficient is set to 0.8, the noise damping rate (a value obtained by dividing the noise standard deviation in the output image by the noise standard deviation in the input image) decreases as t increases, and the noise damping rate converges when t=∞, as can be seen in FIG. 8.

Further still, with the method that reduces the feedback coefficient as movement increases, the feedback coefficient differs from frame to frame, in accordance with the movement. Therefore, while motion blur can be suppressed, there is a problem in that the noise suppression effects are even more varied than as with formula (1) (the noise suppression effect decreases when movement is great).

SUMMARY OF THE INVENTION

It is an object of the present invention to make the noise suppression effect depended on the feedback coefficient, uniform from frame to frame.

One aspect of the present invention provides an image processing apparatus comprising: a recursive filtering unit adapted to perform recursive filtering that multiplies image data of a previous frame read out from a memory by a, multiplies image data of the present frame by (1−a), adds the resultants together, and stores the resultant of the addition in a memory, wherein a is a coefficient in the range of 0<a<1; and a spatial filtering unit adapted to perform spatial filtering on the recursively filtered image data using a spatial filter modified in accordance with a recursive filtering coefficient and the number of times the recursive filtering has been performed.

Another aspect of the present invention provides an image processing method comprising: performing recursive filtering that multiplies image data of a previous frame read out from a memory by a, multiplies image data of the present frame by (1−a), adds the resultants together, and stores the resultant of the addition in a memory, wherein a is a coefficient in the range of 0<a<1; and performing spatial filtering on the recursively filtered image data using a spatial filter modified in accordance with a recursive filtering coefficient and the number of times the recursive filtering has been performed.

Further features of the present invention will become apparent from the following description of exemplary embodiments (with reference to the attached drawings).

DESCRIPTION OF THE EMBODIMENTS

Preferred embodiments for carrying out the present invention shall be described in detail hereinafter with reference to the drawings.

First Embodiment

Figure 1:
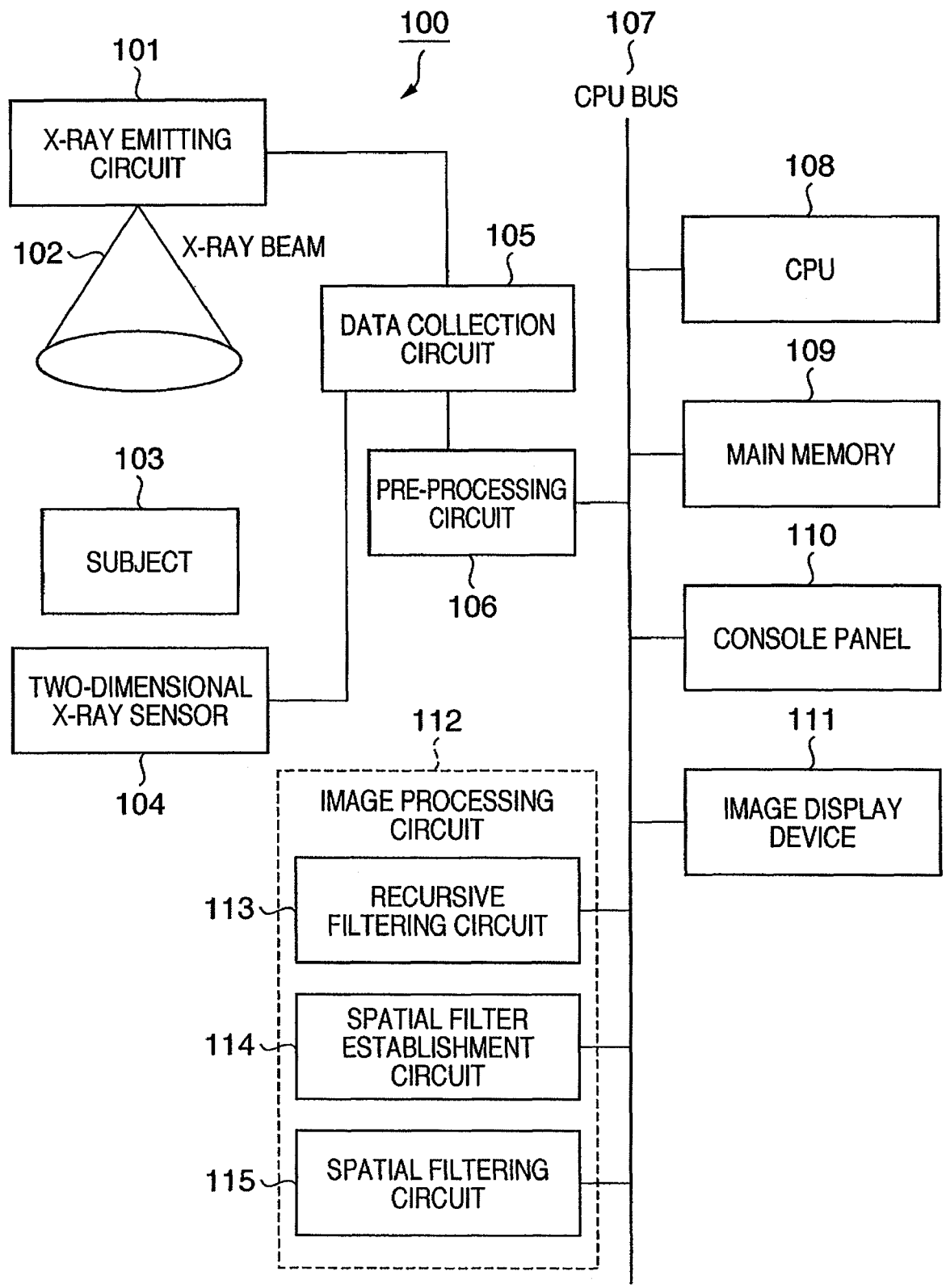
FIG. 1 is a diagram illustrating an example of a configuration of a radiation imaging apparatus according to a first embodiment.

FIG. 1 is a diagram illustrating an example of a configuration of a radiation imaging apparatus according to a first embodiment. In FIG. 1, 100 is an X-ray imaging device that has functionality for performing image processing effective when a video captured using an X-ray beam 102 is outputted on a monitor. The X-ray imaging device 100 includes a data collection circuit 105, a pre-processing circuit 106, a CPU 108, a main memory 109, a console panel 110, an image display device 111, and an image processing circuit 112. These are connected via a CPU bus 107 so as to be capable of exchanging data with one another.

The image processing circuit 112 includes a recursive filtering circuit 113, a spatial filter establishment circuit 114, and a spatial filtering circuit 115, which are connected to the CPU bus 107.

Note that the data collection circuit 105 and the pre-processing circuit 106 are connected to one another, and a two-dimensional X-ray sensor 104 and an X-ray emitting circuit 101 are connected to the data collection circuit 105.

In the X-ray imaging device 100 as described above, the main memory 109 stores various data necessary for processes performed by the CPU 108, and also functions as an operational memory for the CPU 108. The CPU 108 performs operational control and the like of the device as a whole in accordance with operations made via the console panel 110, using the main memory 109. Based on this, the X-ray imaging device 100 operates in the following manner.

First, when an instruction for video capture is inputted by a user via the console panel 110, the CPU 108 communicates the instruction for video capture to the data collection circuit 105. Meanwhile, upon receiving the imaging instruction, the CPU 108 controls the X-ray emitting circuit 101 and the two-dimensional X-ray sensor 104, thereby executing X-ray imaging.

In this X-ray imaging, the X-ray emitting circuit 101 first irradiates a subject 103 with the X-ray beam 102. The X-ray beam 102 irradiated by the X-ray emitting circuit 101 permeates the subject 103 while being attenuated, and reaches the two-dimensional X-ray sensor 104. Then, X-ray image signals are continuously outputted to the data collection circuit 105 by the two-dimensional X-ray sensor 104. In the first embodiment, the subject 103 is assumed to be a human body. In other words, the X-ray image signals outputted from the two-dimensional X-ray sensor 104 are videos of a human body.

Next, the data collection circuit 105 converts the X-ray image signals outputted continuously from the two-dimensional X-ray sensor 104 into predetermined digital signals on a frame-by-frame basis, and supplies the resultant to the pre-processing circuit 106 as X-ray image data. The pre-processing circuit 106 performs pre-processing such as offset cancellation, gain adjustment, and the like on the X-ray image data from the data collection circuit 105. Control performed by the CPU 108 causes the X-ray image data that has been pre-processed by the pre-processing circuit 106 to be transferred, as frame image data, to the main memory 109 and to the image processing circuit 112 via the CPU bus 107.

Figure 7:
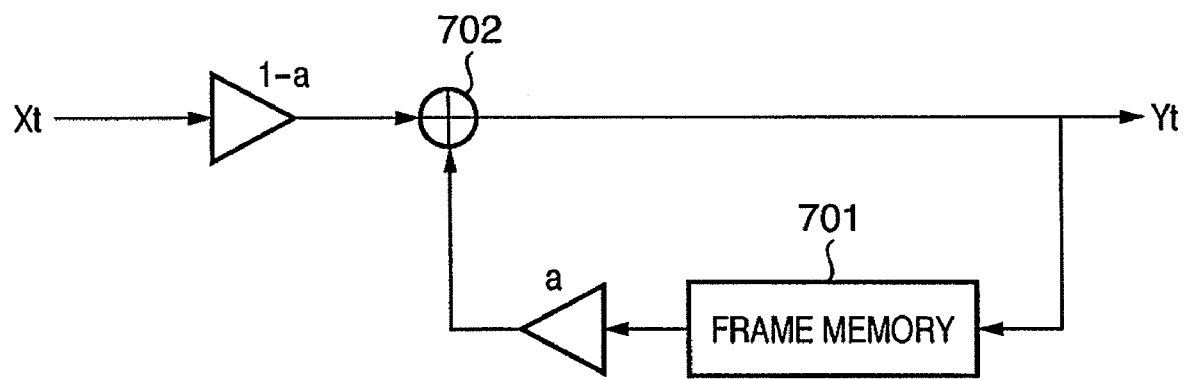
FIG. 7 is a diagram illustrating the configuration of general recursive filtering.
Figure 8:
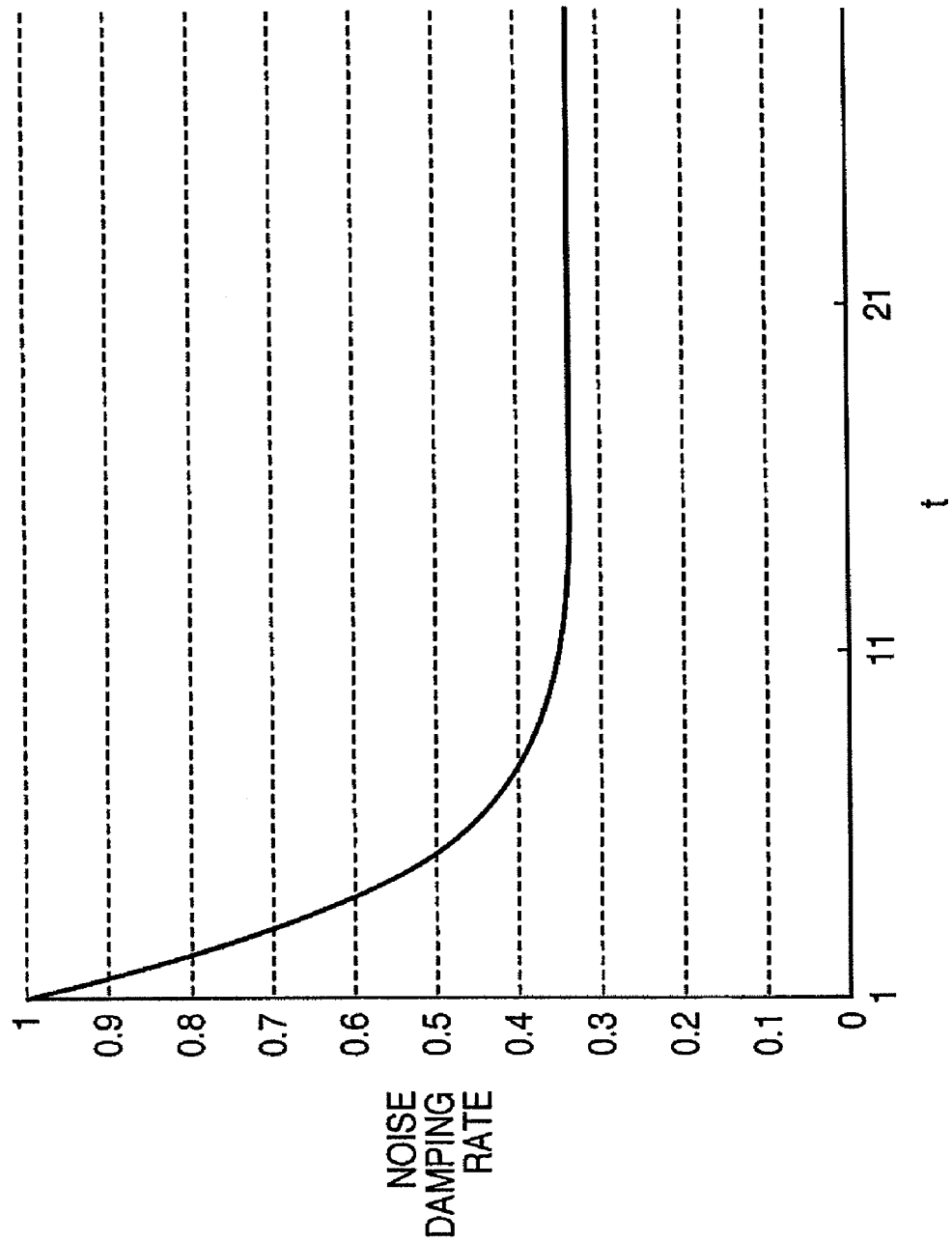
FIG. 8 is a diagram illustrating the noise damping rate in recursive filtering.

In the image processing circuit 112, the recursive filtering circuit 113 performs recursive filtering on the frame image data transferred from the pre-processing circuit 106. The recursive filtering in the present embodiment is a process that, like that illustrated using formula (1) and FIG. 7, performs weighted adding on the image data of the present frame and the image data of the previous, recursively filtered frame, thereby carrying out noise reduction. The spatial filter establishment circuit 114 establishes a spatial filter based on frame information of the frame image data and the feedback coefficient of the recursive filtering circuit 113. The spatial filtering circuit 115 performs spatial filtering on the image data outputted from the recursive filtering circuit 113 using the spatial filter computed by the spatial filter establishment circuit 114. The spatial filtering is a process that performs noise reduction based on the image data within a frame, for which a publicly-known technique, such as that disclosed in Japanese Patent Laid-Open No. H11-252373, is used.

Note that "frame information" is information indicating what frame number the image data of the present frame is relative to when imaging was commenced, and information indicating what frame number the image data of the present frame is relative to when recursive filtering was commenced.

Figure 2:
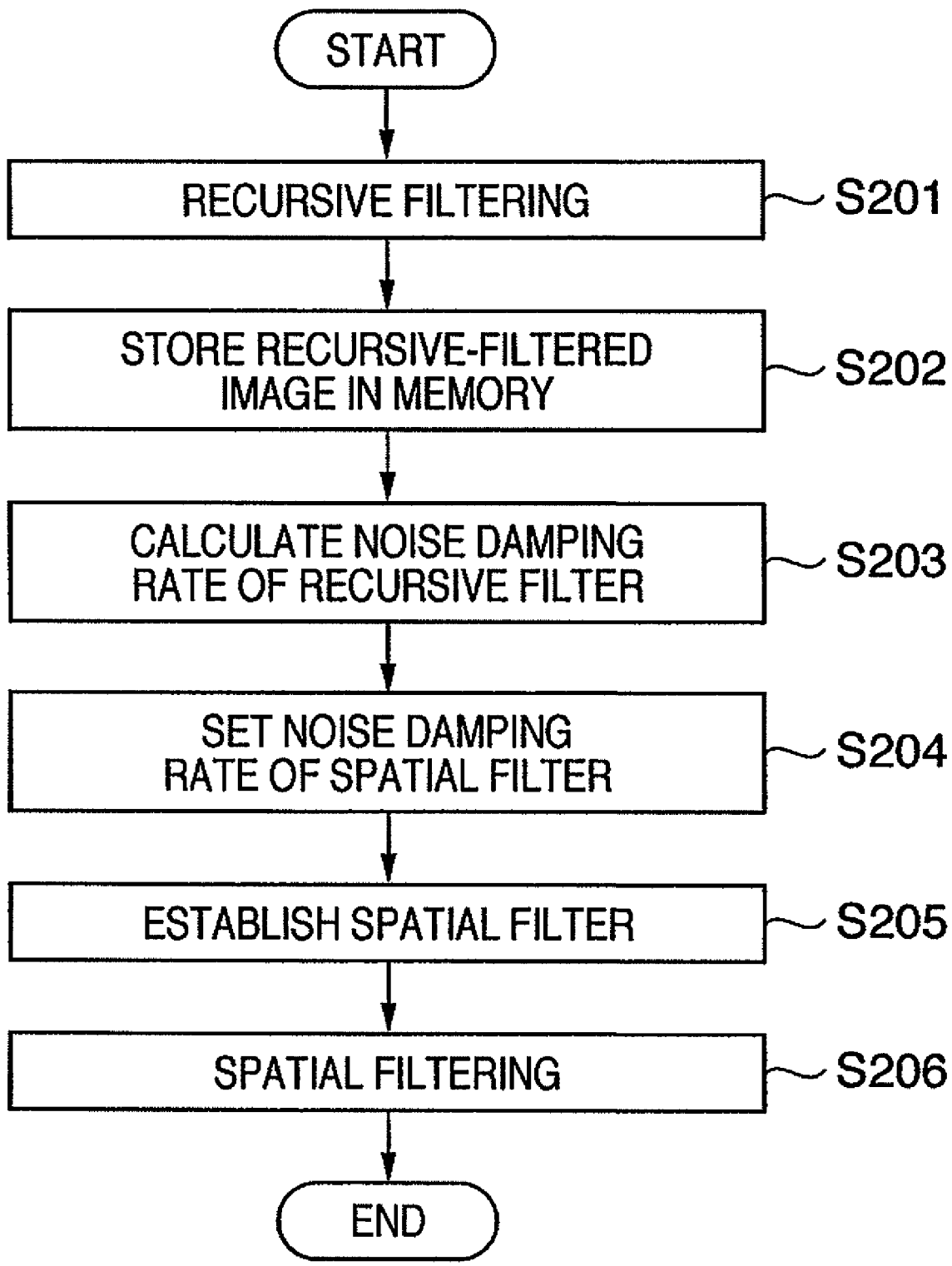
FIG. 2 is a flowchart illustrating a processing procedure of an image processing circuit 112 according to the first embodiment.

Next, a detailed description of the processes performed by the image processing circuit 112 of the X-ray imaging device 100 according to the first embodiment shall be given with reference to FIG. 2.

FIG. 2 is a flowchart illustrating a processing procedure of the image processing circuit 112 according to the first embodiment. As described above, the frame image data that has been pre-processed by the pre-processing circuit 106 is transferred to the image processing circuit 112 via the CPU bus 107. Then, in Steps S201 and S202, the recursive filtering circuit 113 performs recursive filtering on the frame image data through the abovementioned formula (1).

First, in Step S201, recursively filtered image data of the previous frame is read out from the main memory 109, and recursive filtering is performed thereon. Then, in Step S202, the recursively filtered image data is stored in the main memory 109 for the recursive filtering to be performed on the next frame.

Next, in Steps S203 to S205, the spatial filter establishment circuit 114 establishes a spatial filter based on frame information of the frame image data and the feedback coefficient of the recursive filtering circuit 113.

First, in Step S203, the noise damping rate $\alpha(t)$ of the $t^{th}$ frame image data outputted from the recursive filtering circuit 113 is calculated. Note that the noise damping rate is a value found by dividing the noise standard deviation $\sigma_T(t)$ of the recursively filtered image data $Y_t$ by the noise standard deviation $\sigma_{IN}(t)$ of the inputted image data $X_t$. Here, the noise superimposed on the X-ray image data has a characteristic of essentially being temporally uncorrelated; thus the noise damping rate $\alpha(t)$ of the image in the $t^{th}$ frame can be approximately calculated through the following formula (2), using the feedback coefficient a.

$$\alpha(t) = \sqrt{a^{2(t-1)} + \sum_{i=1}^{t-1}((1-a)\times a^{i-1})^2} \qquad (2)$$

Accordingly, when the feedback coefficient a is, for example, ½, the noise damping rate of the image data of the 1st frame is 1, and the noise damping rate of the image data of the 2nd frame is $1/\sqrt{2}$.

Next, in Step S204, a noise damping rate $\beta(t)$ is established for a spatial filter used so that the noise suppression effects are identical. Here, in order to make the noise suppression effects identical, the noise damping rate should be a constant value when recursive filtering and spatial filtering is applied to the inputted image $X_t$. That is, the product of $\alpha(t)$ and $\beta(t)$ should be a constant, as shown in the following formula (3).

$$\alpha(t) \times \beta(t) = \text{const} \tag{3}$$

Note that const is a random constant that fulfills the relationship $\text{const} \leq \alpha(t)$.

Here, const is a constant for prescribing a desired noise damping rate, and may, for example, be set to ½ when the noise in all frames is to be uniformly reduced to 50%. Note that in the first embodiment, const is set to the same value as the feedback coefficient a used in recursive filtering. That is, the noise damping rate $\beta(t)$ of the spatial filter is set through the following formula (4).

$$\beta(t) = a/\alpha(t) \tag{4}$$

Next, in Step S205, a spatial filter h, in which the noise damping rate is $\beta(t)$, is established. Here, because the noise superimposed on the X-ray image data that has been recursively filtered has a characteristic of essentially being spatially uncorrelated, the spatial filter h may be established so that the following formula (5) holds true.

$$\beta(t) = \|h\|_2 \tag{5}$$

Here, $\|\cdot\|_2$ expresses a Euclidian norm.

The method for establishing the spatial filter is not particularly limited to any specific method, and any method may be used as long as the resulting spatial filter fulfills the above formula (5). Note that in the first embodiment, the spatial filter h is defined as shown below, and the spatial filter h is established so that the noise damping rate is $\beta(t)$:

$$h(i,j) = \begin{cases} (1-k) + k/M^2, & i = (M-1)/2 \text{ and } j = (M-1)/2 \\ k/M^2, & \text{otherwise} \end{cases} \tag{6}$$

Note that $0 \leq i < M$ and $0 \leq j < M$. Here, M is the filter size, and is set to a random odd-numbered value no less than 3. Furthermore, k is a value for specifying a filter coefficient.

Note that the values of M and k are set so that the noise damping rate is $\beta(t)$. That is, M and k may be calculated so that the following formula (7) is fulfilled.

$$\beta(t) = \|h\|_2 \tag{7}$$
$$= \sqrt{\sum_{i=0}^{M-1} \sum_{j=0}^{M-1} |h(i,j)|^2}$$
$$= \sqrt{(1-(1/M^2))k^2 - 2(1-(1/M^2))k + 1}$$

The above formula (7) can furthermore be transformed into the following formula.

$$(1-(1/M^2))k^2 - 2(1-(1/M^2))k + 1 - \beta^2(t) = 0 \tag{8}$$

Here, solving the above formula (8) for k results in the following formula.

$$k = 1 \pm \frac{\sqrt{(1-(1/M^2))^2 - (1-(1/M^2)) \times (1-\beta^2(t))}}{(1-(1/M^2))} \tag{9}$$

Note that the following conditions are required to be met in order for k to have a real-number solution.

$$(1-(1/M^2))^2 - (1-(1/M^2)) \times (1-\beta_2(t)) \geq 0 \tag{10}$$

Simplifying the above formula (10) results in the following inequality.

$$M \geq 1/\beta(t) \tag{11}$$

Accordingly, M and k, based on which the noise damping rate is $\beta(t)$, can be calculated from the above formulas (9) and (11). In other words, if a filter size M that fulfills the above formula (11) is set in accordance with the noise damping rate $\beta(t)$, and k is calculated through the above formula (9), a desired filter can be established.

Next, in Step S206, the spatial filtering circuit 115 uses the spatial filter h established by the spatial filter establishment circuit 114 to perform spatial filtering. To be more specific, spatial filtering is performed on the recursively filtered image data $Y_t$ outputted from the recursive filtering circuit 113 through a formula such as the following, creating image data $Z_t$ having a desired noise damping rate.

$$Z_t = h * Y_t \tag{12}$$

Here, * expresses a convolution integral.

As described thus far, by establishing a spatial filter in accordance with the feedback coefficient, and combining recursive filtering and spatial filtering, the first embodiment has the effect of making uniform variations from frame to frame in noise suppression effects dependent on a feedback coefficient.

Second Embodiment

Next, a second embodiment according to the present invention shall be described in detail with reference to the drawings. The second embodiment adds a feedback coefficient changing circuit to the image processing circuit of the first embodiment.

Figure 3:
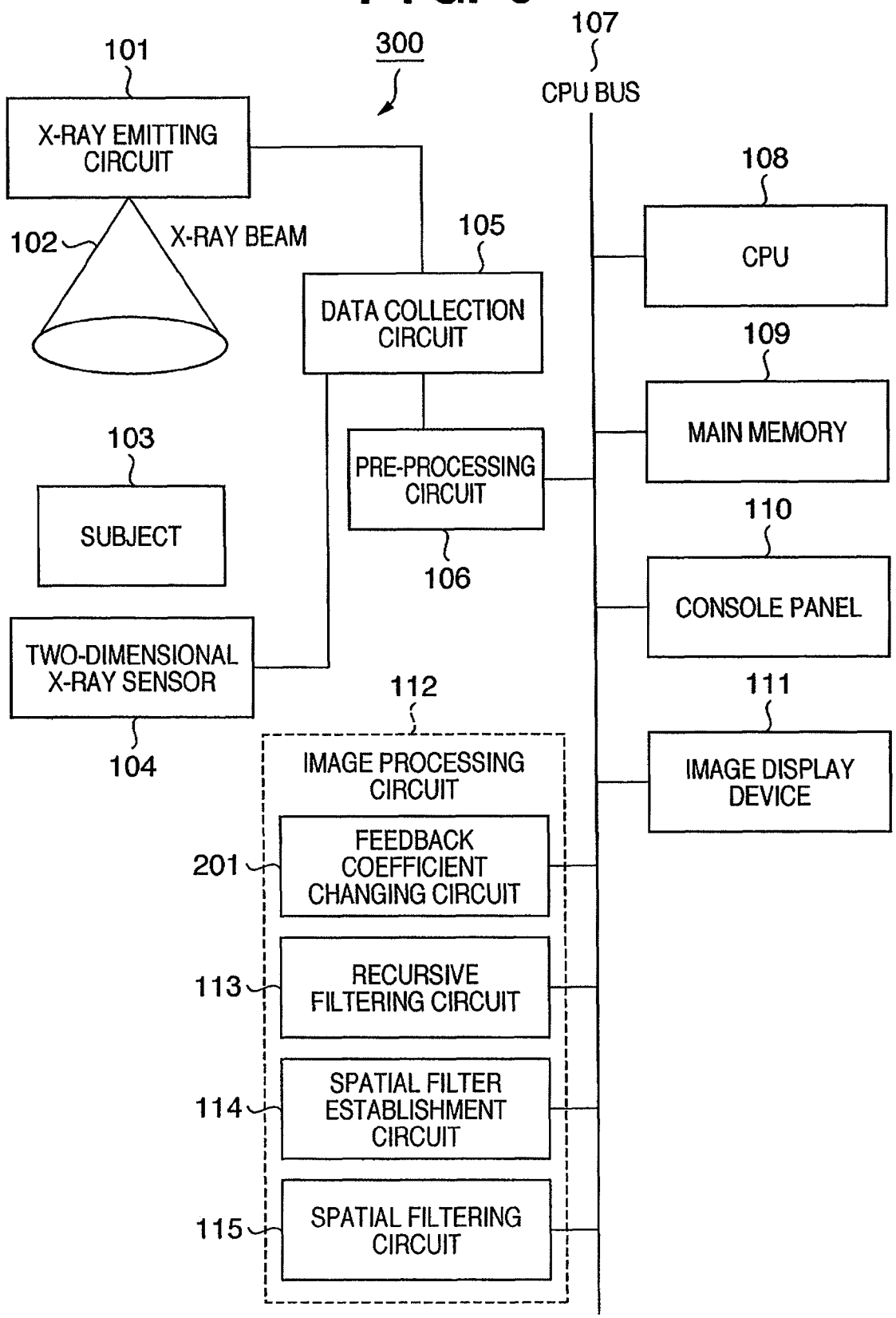
FIG. 3 is a diagram illustrating an example of a configuration of a radiation imaging apparatus according to a second embodiment.

FIG. 3 is a diagram illustrating an example of a configuration of a radiation imaging apparatus according to a second embodiment. In an X-ray imaging device 300 shown in FIG. 3, constituent elements having identical functionality to those in the X-ray imaging device 100 shown in FIG. 1 shall be given the same reference numerals, and descriptions thereof shall be omitted.

Figure 4:
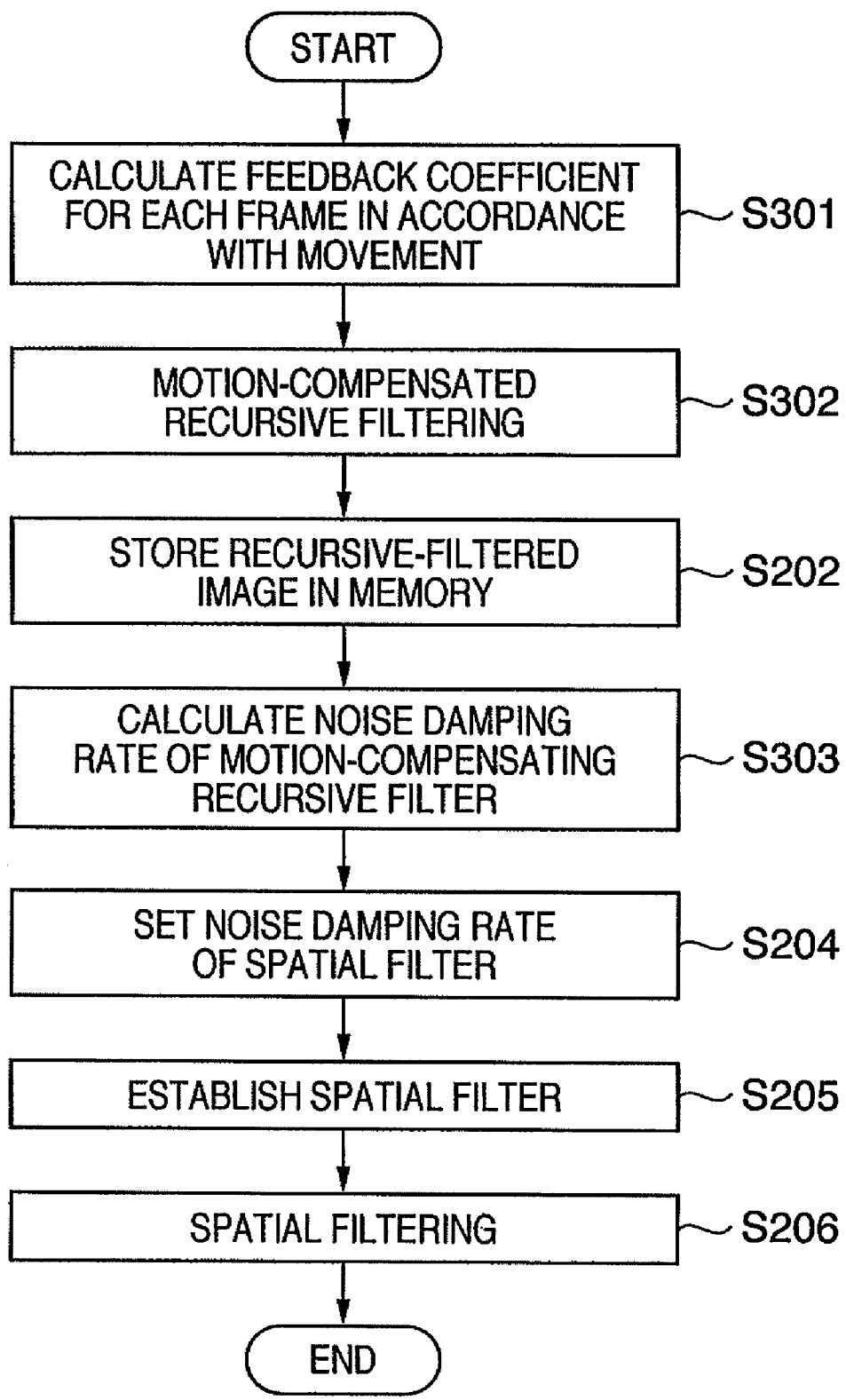
FIG. 4 is a flowchart illustrating a processing procedure of an image processing circuit 112 according to the second embodiment.

FIG. 4 is a flowchart illustrating a processing procedure of an image processing circuit 112 according to the second embodiment. In the processing procedure shown in FIG. 4, steps identical to those in FIG. 2 shall be given identical reference numerals, and descriptions thereof shall be omitted.

First, in Step S301, a feedback coefficient changing circuit 201 calculates a feedback coefficient for each frame in accordance with the movement therein. The method for calculating the feedback coefficient for each frame used here is not intended to be particularly limited. In the second embodiment, the feedback coefficient b(t) for each frame is calculated through the following formula based on the image data $X_t$ of the present frame and the image data $X_{t-1}$ of the previous frame.

$$b(t) = \begin{cases} a, & v_{th} \geq E\|X_t - X_{t-1}\|_2^2 \\ a \times \dfrac{v_{th}}{E\|X_t - X_{t-1}\|_2^2}, & v_{th} < E\|X_t - X_{t-1}\|_2^2 \end{cases} \tag{13}$$

Here, $t > 0$, and $X_0 = X_1$. Furthermore, E expresses an averaging operation.

Here, a is a reference feedback coefficient set in the range of $0 < a < 1$. Furthermore, $v_{th}$ is a threshold for setting the noise level, and may be set to an appropriate value in accordance with the level of noise superimposed on the frame image; it is preferable to set the threshold at approximately twice the noise distribution.

Moreover, the condition of the above-mentioned threshold (the right side of the inequality) is a mean square error (MSE) of the present frame image and the previous frame image, and the value is a minimum (approximately twice the noise distribution) if there is no movement between frames. Conversely, the MSE is a large value if the movement between frames is great. Accordingly, with the above formula, the feedback coefficient a, used as a reference, is reduced when the movement is great, making it possible to suppress motion blur.

Note that the feedback coefficient a used as a reference may use an arbitrary value set by the user via the console panel 110. Furthermore, because the level of noise superimposed on X-ray image data generally differs depending upon the X-ray amplitude, the image may be divided into blocks (for example, the image may be divided into 64×64 pixels) and a variable feedback coefficient may be calculated on a block-by-block bases through the above formula. In such a case, because the feedback coefficient differs from block to block, the recursive filtering and spatial filtering carried out in later stages may be sequentially executed on a block-by-block basis.

Next, in Step S302, the recursive filtering circuit 113 executes recursive filtering that suppresses motion blur through the following formula, using the feedback coefficient b(t) calculated by the feedback coefficient changing circuit 201. Furthermore, the image data Y(t) that was recursively filtered in Step S202 is stored in the main memory 109.

$$Y_t = (1-b(t)) \times X_t + b(t) \times Y_{t-1} \qquad (14)$$

Here, t>0, and $Y_0 = X_1$.

Next, in Steps S303 to S205, the spatial filter establishment circuit 114 establishes a spatial filter based on frame information of the frame image data and the feedback coefficient changed by the feedback coefficient changing circuit 201.

First, in Step S303, the noise damping rate α(t) of the $t^{th}$ frame image data outputted from the recursive filtering circuit 113 is calculated using the following formula.

$$\alpha(t) = \begin{cases} 1, & t=1 \\ \sqrt{\prod_{i=2}^{t}(b(i))^2 + \sum_{i=2}^{t}\left((1-b(i)) \times \prod_{j=i+1}^{t} b(j)\right)^2}, & \text{otherwise} \end{cases} \qquad (15)$$

Then, in Steps S204 to S205, a spatial filter having a desired noise damping rate is established, and in Step S206, the spatial filtering circuit 115 performs spatial filtering on the recursively filtered frame image data.

As described thus far, the second embodiment has the effect of suppressing motion blur by using a variable feedback coefficient in accordance with movement, in addition to the effects of the first embodiment.

Third Embodiment

Next, a third embodiment according to the present invention shall be described in detail with reference to the drawings. The third embodiment adds a frequency component division circuit to the image processing circuit of the second embodiment.

Figure 5:
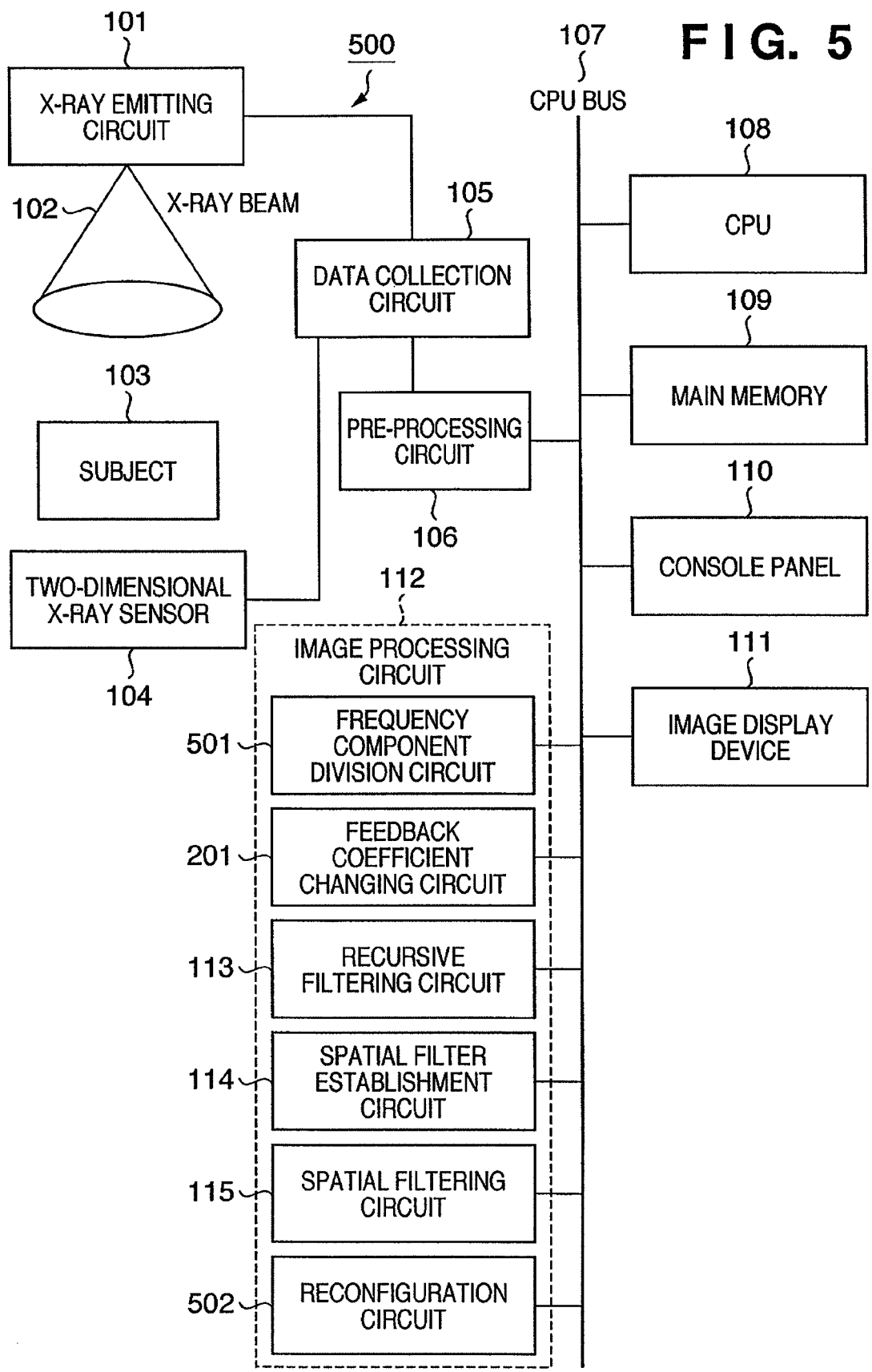
FIG. 5 is a diagram illustrating an example of a configuration of a radiation imaging apparatus according to a third embodiment.

FIG. 5 is a diagram illustrating an example of a configuration of a radiation imaging apparatus according to a third embodiment. In an X-ray imaging device 500 shown in FIG. 5, constituent elements having identical functionality to those in the X-ray imaging device 300 shown in FIG. 3 shall be given the same reference numerals, and descriptions thereof shall be omitted.

Figure 6:
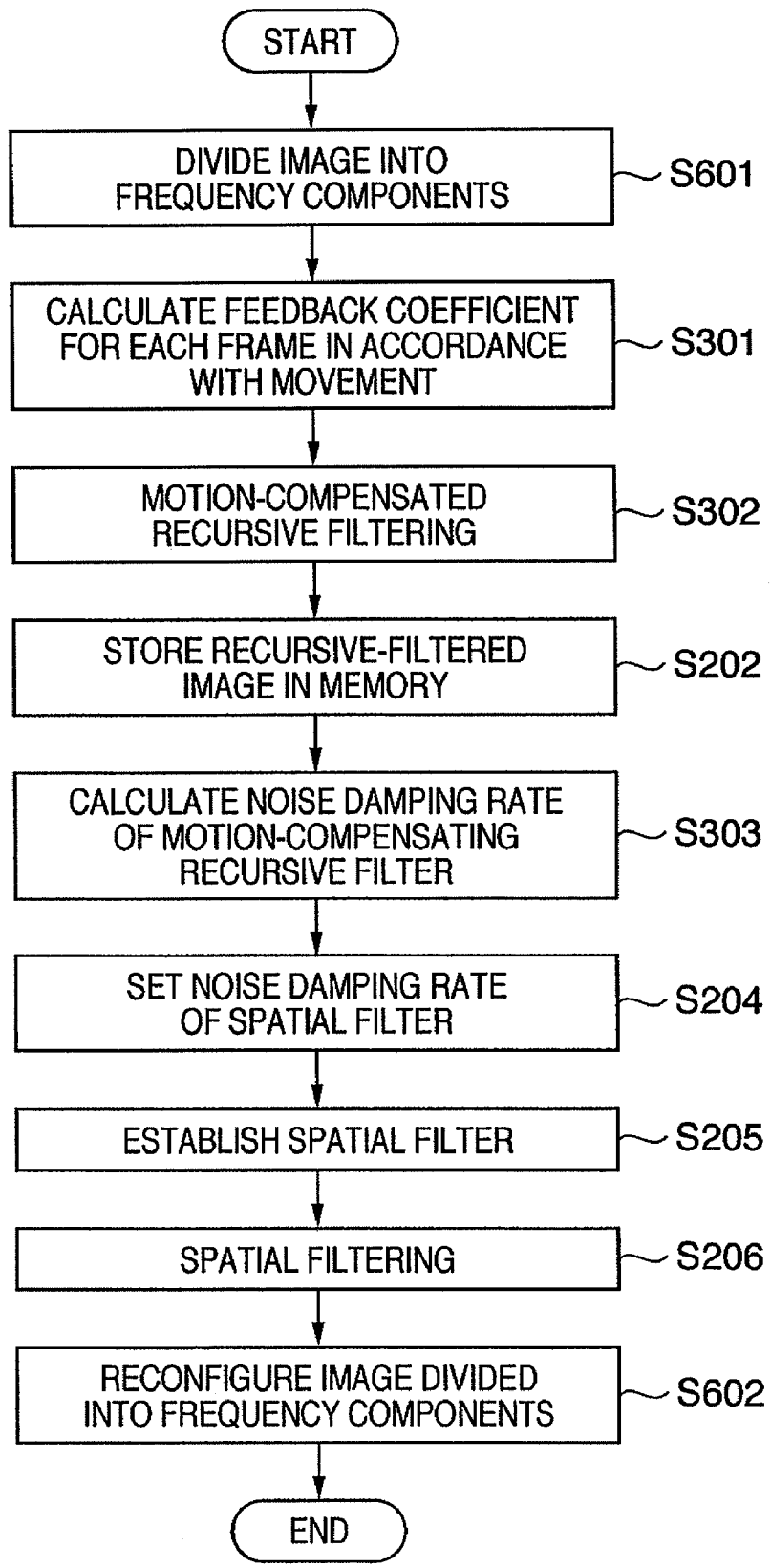
FIG. 6 is a flowchart illustrating a processing procedure of an image processing circuit 112 according to the third embodiment.

FIG. 6 is a flowchart illustrating a processing procedure of an image processing circuit 112 according to the third embodiment. In the processing procedure shown in FIG. 6, steps identical to those in FIG. 4 shall be given identical reference numerals, and descriptions thereof shall be omitted.

First, in Step S601, the frequency component division circuit 501 divides the image data $X_t$ of the inputted present frame into image data of two or more frequency bandwidths. Here, the division method is not particularly limited. In the third embodiment, the image data is divided into low-frequency image data $L_t$ and high-frequency image data $H_t$ using a low-pass filter g, as shown below.

$$L_t = g * X_t$$

$$H_t = X_t - L_t \qquad (16)$$

Note that a running average filter, a Gaussian filter, or the like are examples of filters that can be used as the low-pass filter.

Next, Steps S301 to S206 are executed on the image data of the desired frequency bandwidth, from among the image data resulting from the division performed by the frequency component division circuit 501, and noise reduction limited to that frequency bandwidth is carried out. Note that in the third embodiment, noise reduction is carried out only on the high-frequency image data $H_t$ resulting from the division performed by the frequency component division circuit 501.

Next, in Step S602, a reconfiguration circuit 502 reconfigures a single piece of image data $\hat{X}_t$ from the low-frequency image data $L_t$ and the noise-reduced high-frequency image data $H_t$. The reconfiguration may be performed by inverting the above formula (16), as shown in the following formula.

$$\hat{X}_t = H_t + L_t \qquad (17)$$

As described thus far, the third embodiment has the effect that noise reduction limited to a desired frequency bandwidth can be executed, in addition to the effects of the second embodiment.

Note that in the third embodiment, an image is divided into frequency components and then reconfigured through the above formula, but the embodiment is not intended to be limited to this configuration; a wavelet transform, a Laplacian pyramid, or the like may be used. In other words, the technical concept of the third embodiment can be applied even in cases where other frequency component division processes are used.

Furthermore, although in the third embodiment the image data is divided into image data of two frequency bandwidths, it is possible to divide the image data into three or more frequency bandwidths, and perform noise reduction on only the image data of a desired frequency bandwidth. In such a case, it is possible to perform the noise reduction on the desired frequency bandwidth and furthermore enhance the image data of another desired frequency bandwidth aside from the first desired frequency bandwidth. This makes it possible to improve the sharpness of a desired bandwidth in addition to performing noise reduction.

Although preferred embodiments of the present invention have been described thus far, it goes without saying that the present invention is not intended to be limited to the embodiments described herein, and that many variations and alterations are possible without departing from the essence of the present invention.

Note that the present invention includes the case where a software program that realizes the functionality of the above-mentioned embodiments is directly or remotely supplied to a system or device and the program code thereof is read out and executed by a computer in the system or device.

Accordingly, the program code itself, installed in a computer so as to realize the functional processing of the present invention through a computer, also realizes the present invention. In other words, the computer program itself, for realizing the functional processing of the present invention, is also included within the scope of the present invention.

Furthermore, a flexible disk, a hard disk, an optical disk, a magneto-optical disk, magnetic tape, a non-volatile memory card, a DVD, and the like are examples of storage media that can be used to supply the program.

Alternatively, using a browser of a client computer to connect to an Internet homepage and downloading the computer program of the present invention to a storage medium such as a hard disk can be given as another method for supplying the program. Note that the program may be a file that includes an automatic installation function. Furthermore, this method may be realized by dividing the program code that makes up the program of the present invention into a plurality of files and downloading each file from different homepages. In other words, a WWW server that allows a plurality of users to download the program files for realizing the functional processing of the present invention through a computer is also included within the scope of the present invention.

The program may furthermore be encrypted and stored in a storage medium that is then distributed to users, where users who clear certain predetermined conditions are allowed to download key information for decrypting the files obtained from a website via the Internet. It is then possible to execute the encrypted program by using the key information, install the program in the computer, and implement its functionality.

The functionality of the aforementioned embodiments can also be implemented by an OS or the like running on a computer executing part or all of the processing based on instructions in the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-056372, filed Mar. 6, 2007 which is hereby incorporated by reference herein in its entirety.

What is claimed is:

1. An image processing apparatus comprising:
a recursive filtering unit adapted to perform recursive filtering that multiplies image data of a recursive frame read out from a memory by a, multiplies image data of the present frame by (1−a), adds the resultants together, and substitutes the resultant of the addition for the recursive frame in the memory, wherein a is a recursive filtering coefficient in the range of 0<a<1; and
a spatial filtering unit adapted to perform spatial filtering on the recursively filtered image data using a spatial filter modified in accordance with the recursive filtering coefficient and the number of times the recursive filtering has been performed,
wherein the image data is image data of a captured video, and
a noise damping rate of the image data processed by the recursive filtering unit is calculated based on information on the recursive filtering coefficient, and on one of information indicating at least what number frame the image data of the present frame is relative to when imaging was commenced and information indicating what number frame the image data of the present frame is relative to when the recursive filtering was commenced.

2. The apparatus according to claim 1, wherein the spatial filter is modified so that the product of the noise damping rate of the image data processed by the spatial filtering unit and the noise damping rate of the image data processed by the recursive filtering unit is a predetermined noise damping rate.

3. An image processing method comprising the steps of:
performing recursive filtering, using a recursive filtering circuit, that multiplies image data of a recursive frame read out from a memory by a, multiplies image data of the present frame by (1−a), adds the resultants together, and substitutes the resultant of the addition for the recursive frame in the memory, wherein a is a recursive filtering coefficient in the range of 0<a<1; and
performing spatial filtering, using a spatial filtering circuit, on the recursively filtered image data using a spatial filter modified in accordance with the recursive filtering coefficient and the number of times the recursive filtering has been performed,
wherein the image data is image data of a captured video, and
a noise damping rate of the image data processed by the recursive filtering unit is calculated based on information on the recursive filtering coefficient, and one of information indicating at least what number frame the image data of the present frame is relative to when imaging was commenced and information indicating what number frame the image data of the present frame is relative to when the recursive filtering was commenced.

4. The method according to claim 3, wherein the spatial filter is changed so that the product of the noise damping rate of the image data processed in the spatial filtering step and the noise damping rate of the image data processed in the recursive filtering step is a predetermined noise damping rate.

5. A non-transitory computer-readable storage medium storing a program for causing a computer to execute the image processing method according to claim 3.

6. An image processing apparatus comprising:
a recursive filtering unit adapted to perform recursive filtering that multiplies image data of a recursive frame read out from a memory by a, multiplies image data of the present frame by (1−a), adds the resultants together, and substitutes the resultant of the addition for the recursive frame in the memory, wherein $\alpha$ is a recursive filtering coefficient in the range of 0<a<1;
a spatial filtering unit adapted to perform spatial filtering on the recursively filtered image data using a spatial filter; and
a modification unit adapted to modify the spatial filter so that the product of the noise damping rate of the image data processed by the spatial filtering unit and the noise damping rate of the image data processed by the recursive filtering unit is a predetermined noise damping rate.

7. The apparatus according to claim 6, wherein
the image data is image data of a captured video; and
a noise damping rate of the image data processed by the recursive filtering unit is calculated based on information on the recursive filtering coefficient and on one of information indicating at least what number frame the image data of the present frame is relative to when imaging was commenced and information indicating what number frame the image data of the present frame is relative to when the recursive filtering was commenced.

8. An image processing method comprising the steps of:
performing recursive filtering, using a recursive filtering circuit, that multiplies image data of a recursive frame read out from a memory by a, multiplies image data of the present frame by (1−a), adds the resultants together, and substitutes the resultant of the addition for the recursive frame in the memory, wherein a is a recursive filtering coefficient in the range of 0<a<1;

performing spatial filtering, using a spatial filtering circuit, on the recursively filtered image data using a spatial filter; and modifying the spatial filter so that the noise damping rate of the image data processed by the spatial filtering unit satisfies a predetermined condition.

9. A non-transitory computer-readable storage medium storing a program for causing a computer to execute the image processing method according to claim 8.

* * * * *